(12) United States Patent
Shimizu et al.

(10) Patent No.: US 7,793,815 B2
(45) Date of Patent: Sep. 14, 2010

(54) ULTRASONIC BONDING EQUIPMENT AND RESULTING BONDING STRUCTURE

(75) Inventors: Akira Shimizu, Yokohama (JP); Hidenobu Matsuyama, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 1183 days.

(21) Appl. No.: 11/340,407

(22) Filed: Jan. 26, 2006

(65) Prior Publication Data
US 2006/0169388 A1    Aug. 3, 2006

(30) Foreign Application Priority Data

| Jan. 28, 2005 | (JP) | ............................. 2005-021589 |
| Dec. 1, 2005 | (JP) | ............................. 2005-348304 |

(51) Int. Cl.
B23K 1/06    (2006.01)
(52) U.S. Cl. ...................... 228/1.1; 228/110.1; 156/73.1
(58) Field of Classification Search .................. 228/1.1; 156/580.1, 580.2, 73.1
See application file for complete search history.

(56) References Cited

U.S. PATENT DOCUMENTS

| 4,311,540 A | * | 1/1982 | Hill ............................ 156/73.1 |
| 4,767,492 A | * | 8/1988 | Fukusima et al. ........ 156/580.2 |
| 5,059,277 A | * | 10/1991 | Willhite et al. ........... 156/580.1 |
| 5,525,172 A | | 6/1996 | Cadiou |
| 6,056,185 A | | 5/2000 | Daroux et al. |
| 6,523,732 B1 | | 2/2003 | Popoola et al. |
| 6,824,630 B2 | * | 11/2004 | Oishi et al. ................ 156/73.1 |
| 2002/0100534 A1 | | 8/2002 | Distel |
| 2003/0111512 A1 | | 6/2003 | O'Connell et al. |

FOREIGN PATENT DOCUMENTS

| JP | S60-201928 | 10/1985 |
| JP | 09-239567 | 9/1997 |
| JP | 10-225779 | 8/1998 |
| JP | 2003-059486 | 2/2003 |

\* cited by examiner

*Primary Examiner*—Jessica L Ward
*Assistant Examiner*—Kevin E Yoon
(74) *Attorney, Agent, or Firm*—Global IP Counselors, LLP (57) ABSTRACT

The disclosure is directed to ultrasonic bonding equipment, in which the anvil and horn include protrusions of varying height to grip the material being bonded. The outer protrusions may form smaller or differently shaped indentations in the material to reduce material stresses of the material at the outer region of the material. An exemplary embodiment of an ultrasonic bonding system includes an anvil and a horn arranged facing the anvil to ultrasonically bond a gripped portion of two or more layers of material. The gripped portion of the layers includes an inner region and an outer region. The anvil and the horn apply a gripping force to the outer region that is less than a gripping force applied to the inner region of the gripped materials.

6 Claims, 10 Drawing Sheets

Fig. 16

ULTRASONIC BONDING EQUIPMENT AND RESULTING BONDING STRUCTURE

This application claims priority from Japanese Patent Application No. 2005-021589, filed Jan. 28, 2005, and Japanese Patent Application No. 2005-348304, filed Dec. 1, 2005, the entire contents of each being incorporated herein by reference.

TECHNICAL FIELD

The invention relates to bonding of materials and, more specifically, ultrasonic bonding techniques and resulting materials.

BACKGROUND

Ultrasonic bonding equipment may be used to bond two or more overlaid sheets, or layers, of metal or other material with ultrasonic energy. The layers may be similar or dissimilar materials. Protrusions of an anvil and a horn contact the materials when the materials are placed between the anvil and the horn. Energy is applied to force the protrusions of the anvil and horn into the materials while the horn concurrently applies a back-and-forth linear motion from the supersonic vibration transferred through the horn from a transducer that generates the vibration. As a result, the materials between the protracting parts of the anvil and horn are bonded together.

When using ultrasonic bonding equipment, impurities, such as oxide film, are first removed by conditioning the contact surface of the layers of metal. Due to the pressure and the supersonic vibration, the materials undergo solid-state welding from the frictional heat generated by the contact of the two clean material surfaces.

SUMMARY

In general, the disclosure is directed to ultrasonic bonding equipment in which the anvil and horn include protrusions of varying height to grip the material being bonded. The outer protrusions may form smaller or differently shaped indentations in the material to reduce material stresses of the material at the outer region of the material. In addition, the outer and inner protrusions may be spaced apart to further reduce stresses in the material in crease the strength of the bonded material.

In one embodiment, the disclosure is directed to an ultrasonic bonding system that includes an anvil and a horn arranged facing the anvil to ultrasonically bond a gripped portion of two or more layers of material. The gripped portion of the layers includes an inner region and an outer region. The anvil and the horn apply a gripping force to the outer region that is less than a gripping force applied to the inner region of the gripped materials.

In another embodiment, the disclosure is directed to a method that includes placing two or more layers of a material between an anvil and a horn, wherein both the anvil and the horn comprise an outer region and an inner region. The method further comprises gripping the materials with less gripping force from the outer regions of the anvil and the horn than the inner regions of the anvil and the horn, and bonding the two or more layers of material ultrasonically.

In an alternative embodiment, the disclosure is directed to a system that includes a plurality of flat batteries and at least one connector comprising an inner region and an outer region coupled to each of the plurality of flat batteries, wherein the outer region comprises a greater material strength than the inner region.

In an additional alternative embodiment, the disclosure is directed to a system for ultrasonic bonding that includes means for gripping two or more layers of a materials between an anvil and a horn, wherein both the anvil and the horn comprise an outer region and an inner region. The system further comprises means for producing a gripping force at the outer region of the gripping means less than a gripping force at the inner region of the gripping means, and means for bonding the materials.

The disclosure may provide one or more advantages. For example, in conventional systems, the thickness of the metal sheets around the outer protrusions may become thin due to the protrusions further digging into the material during vibration and pressurization. When tensile load and vibrations are applied to the material after bonding is completed, this shrinkage may lead to crack may be generated within or around the bonded areas of the material and lead to the risk of material breakage.

More specifically, during ultrasonic bonding, the material gripped between the anvil and the horn is vibrated while the non-gripped area of the material remains still. Consequently, the boundary of the gripping area and the non-gripping area expands or contracts significantly during vibration, and shrinkage or compression of the thickness of the material may result in formation of cracks at this boundary. Furthermore, stress generated from the external force after bonding the material may be concentrated on parts of the material that have become thin around the outer portion of the bonded parts, in which the thin material may include or be susceptible to cracks In contrast, with respect to embodiments of the invention, shrinkage or compression of the thickness of the outer parts of the layers in the gripping area of the bonding materials may be less than the shrinkage of the thickness of the medial parts of the material. Consequently, the thickness of the layers at the indentation sites of the outer region is thicker than the thickness of the indentation sites of the medial region. Therefore, the generation of cracks at the edge of the outer region may be prevented or reduced by embodiments of the invention because of the increased strength of the outer region of the bonded material. In other words, increasing the thickness of the outer region of the bonded materials may improve the rupture strength and fatigue strength of the bonded materials, thereby preventing or reducing cracks due to an external force, such as a tensile load and vibrations, being applied to the bonded materials.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
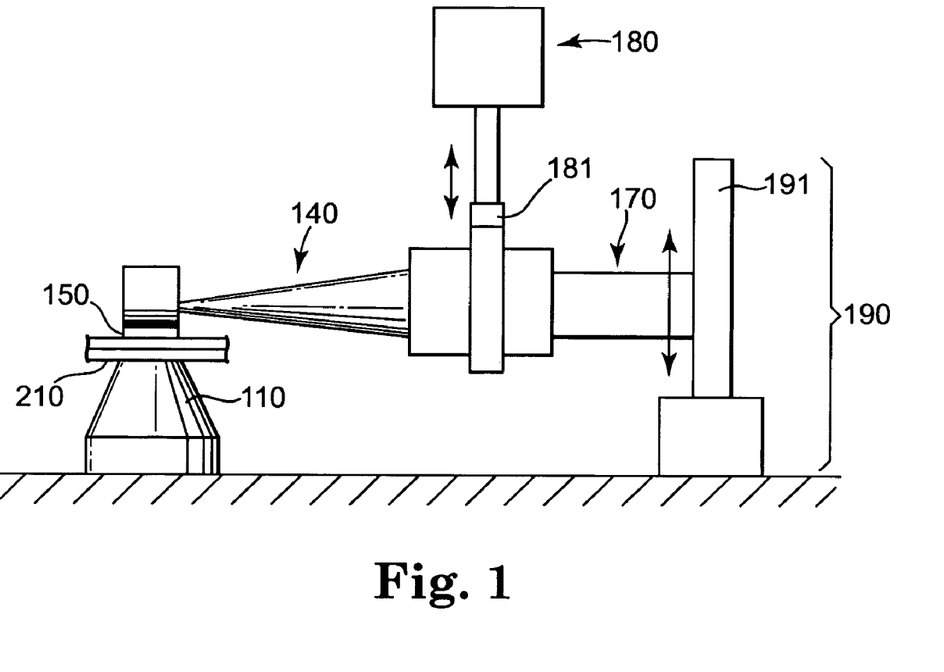
FIG. 1 is an illustration of exemplary ultrasonic bonding equipment.
Figure 2:
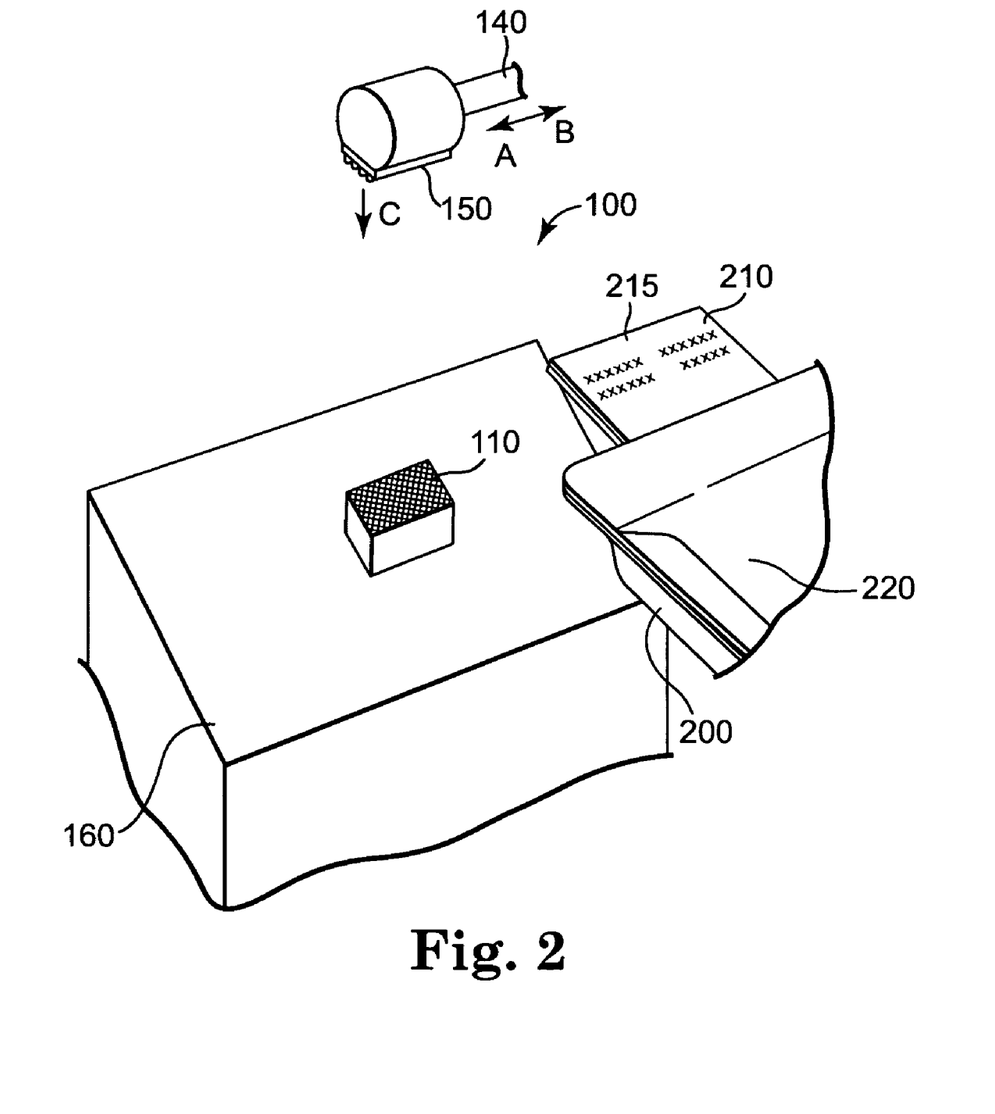
FIG. 2 is a perspective view of exemplary ultrasonic bonding equipment and a connector of a flat battery.
Figure 3:
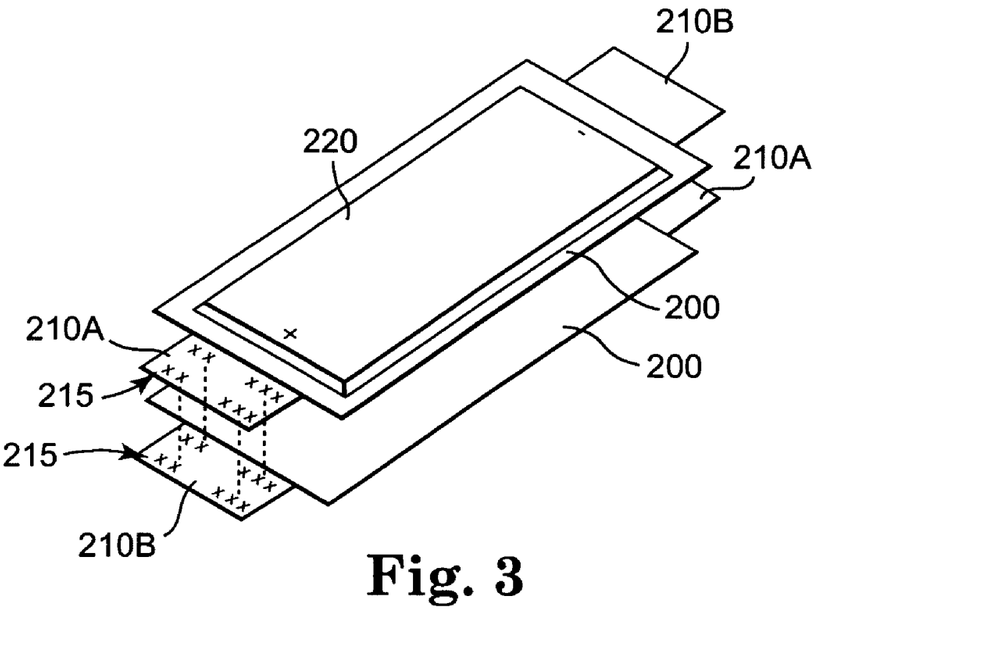
FIG. 3 is a perspective view of a flat electric cell utilizing bonded material as connectors.
Figure 4:
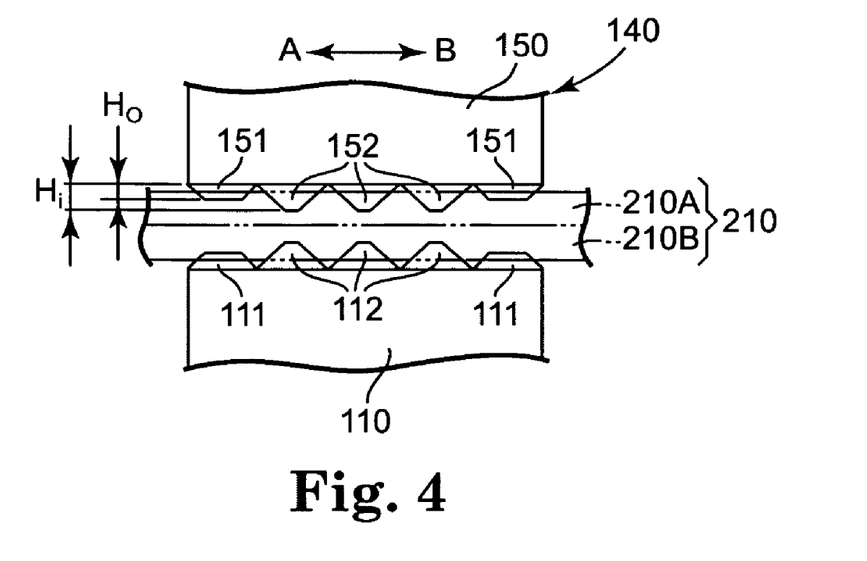
FIG. 4 is a cross-section of an anvil, a horn, and the bonded material showing outer and medial protrusions.

FIG. 1 is an illustration of exemplary ultrasonic bonding equipment. FIG. 2 is a perspective view of exemplary ultrasonic bonding equipment and a connector of a flat battery. FIG. 3 is a perspective view of a flat electric cell utilizing bonded material as connectors. FIG. 4 is a cross-section of an anvil, a horn, and the bonded material showing outer and medial protrusions.

In the example embodiment of FIG. 1 and FIG. 2, ultrasonic bonding equipment 100 includes anvil 110, horn 140, ultrasonic transducer 170, and pressure device 180. Anvil 110 is a securing tool that undergoes ultrasonic vibration in ultrasonic bonding equipment 100, and horn 140, i.e. a sonotrode or means for bonding, is a member that transmits ultrasonic vibration produced by ultrasonic transducer 170 to the material between the anvil and the horn. Horn 140 is equipped with horn tip 150, which is a component that contacts the material at the tip of horn 140. Pressure device 180, equipped with pressure pad 181, moves pressure pad 181 in an upward and downward direction as shown by the arrow in the figure. Consequently, pressure device 180 can press horn 140 downward, or onto the material between horn 140 and anvil 110, with predetermined pressure strength.

Furthermore, ultrasonic bonding equipment 100 includes lifting gear 190 that moves horn 140 up or down to bond materials of different sizes. Lifting gear 190 is equipped with guide 191 and can move horn 140 and ultrasonic transducer 170 in an upward and downward direction as shown by the arrow in the figure along with guide 191.

In the embodiment of FIGS. 1-4, horn 140 is lifted by lifting gear 190 to place the material on anvil 110. The material is an electrode tab 210 of an electric cell 200. Electric cell 200 is a flat battery that may be combined with other flat batteries into a battery assembly that stores power. Each electric cell 200 may include one or more electrode tab 210, i.e. a connector. After introducing the material to anvil 110, horn 140 is lowered by lifting gear 190, until horn tip 150 meets the material. Subsequently, pressure device 180 presses horn 140 downward. Along with applying the lateral ultrasonic vibration of the direction shown in A-B of FIG. 2 by ultrasonic transducer 170, pressure device 180 applies the vertical downward force in the direction of C of FIG. 2 on horn 140. In other words, horn tip 150 can be pressurized against anvil 110 with the material, i.e. electrode tab 210, placed in between the anvil and the tip. Horn tip 150 is ultrasonically vibrated while being pressurized. In addition, electrode tab 210 is the general term for electrode tabs 210A and 210B of FIG. 3. Anvil 110 is installed on jig base 160.

Multiple protrusions 111 and 112, i.e., means for gripping two or more layers of a materials between an anvil and a horn, that contact the bonded material are formed on the surface of anvil 110, and multiple protrusions 151 and 152 that contact the bonded material are formed on the surface of horn tip 150. Horn tip 150 is detachable from horn 140. By pressurizing and digging into the bonded materials, protrusions 111, 112, 151, and 152 can mutually secure and integrate anvil 110 and horn tip 150 with each layer of the bonded material. In addition, the detailed structure of anvil 110 and horn tip 150 will be discussed herein.

Electric cell 200 is a rectangular-shaped planar laminated secondary battery, or flat battery, as shown in FIG. 3, including a stacked battery element 220 in which the cathode layer and anode layer have at least been sequentially laminated. A laminated film is used as a jacket material for electric cell 200, and built-in battery element 220 is sealed by thermally bonding the penumbra of electric cell 200.

Electrode tabs 210A, 210B are formed out of the surface of both sides of electric cell 200 in a longitudinal direction. Electrode tab 210A may consist of aluminum foil, which is the positive, or +, electrode tab. On the other hand, electrode tab 210B may consist of copper foil, which is the negative, or −, electrode tab. In this embodiment, the electric cell is constructed with the battery elements back-to-back such that the parts of both battery elements of the electric cell face outward, as shown in FIG. 2, and one positive electrode tab 210A is ultrasonically bonded to electrode tab 210B of the electric cell. In addition, the x mark shown in FIG. 3 identifies the points where protrusions of anvil 110 and horn tip 150 meet.

With respect to ultrasonic bonding equipment 100, the gripping force of the outer region in the gripping area of electrode tab 210 is less than the gripping force of the medial region. Herein, the gripping force is the force exerted to grip the material by horn 140 and anvil 110. 2

Figure 16:
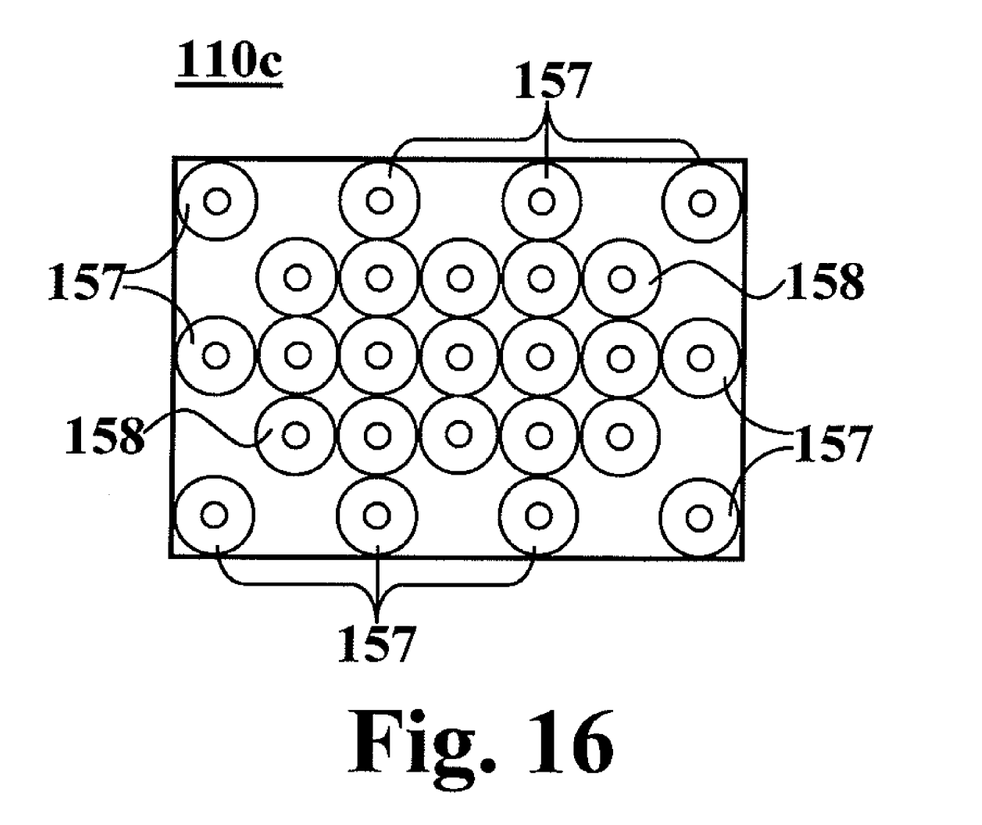
FIG. 16 is a plan view of another version of the exemplary anvil or horn shown in FIG. 13.

As shown in FIG. 4, the height (Ho) of protrusions 111 and 151, i.e., means for producing a gripping force at the outer region of the gripping means less than a gripping force at the inner region of the gripping means, of the outer region is set to be lower than the height Hi of protrusions 112 and 152 of the medial region among the multiple protrusions on anvil 110 and horn tip 150 of horn 140. Protrusions 111, 112, 151, and 152 are, for example, presented in a prismoidal shape formed similar to a pyramidal shape with blunt or flat tips. In other embodiments, other shapes, such as a circular truncated cone (see FIG. 16), may be formed instead of the pyramidal shape. However, the height of the outer protrusions of either anvil 110 or horn tip 150 are formed to be lower than the height of the medial protrusions. The outer protrusions correspond to an outer region of the material where the medial protrusions correspond to an inner region of the material.

As shown in FIG. 4, the positive electrode tab 210A of electric cell 200 and the negative electrode tab 210B of another electric cell 200 are stacked and laid on anvil 110. A vertical downward welding force is applied by horn tip 150 from above electrode tab 210A. The outer region of the material in the gripping area of electrode tab 210 gripped by anvil 110 and horn tip 150 becomes thinner due to the height of protrusions 111 and 151. However, the inner region of the material in the gripping area becomes thinner than the outer region because of the greater height of inner protrusions 112 and 152.

Next, while applying a vertical downward welding force, horn tip 150 of horn 140 is subjected to supersonic vibration in the direction of A-B in shown in FIG. 4. Furthermore, electrode tab 210A and electrode tab 210B undergo solid-state welding through frictional heat generated by the supersonic vibration.

Figure 5:
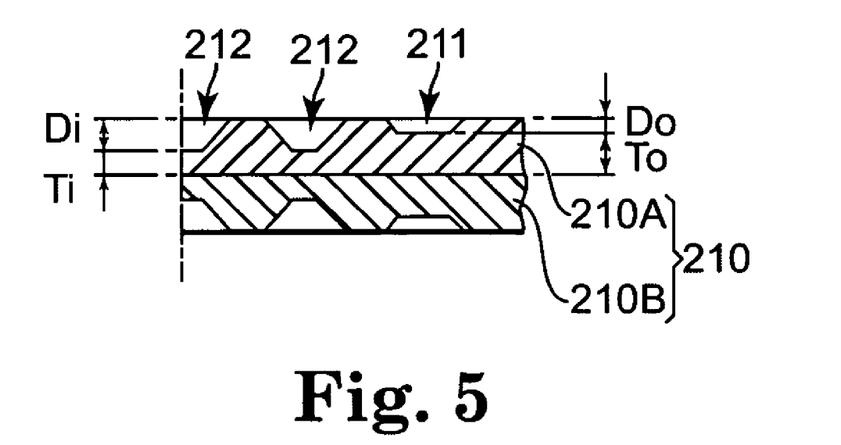
FIG. 5 is a cross-section of materials bonded by the ultrasonic bonding equipment of FIG. 4.

FIG. 5 is a cross-section of materials bonded by the ultrasonic bonding equipment of FIG. 4. Electrode tab 210, which is the material between anvil 110 and horn 140, is ultrasonically bonded by application of pressure and vibration from the equipment 100. Multiple indentations are formed on the external surface of electrode tab 210 due to that pressure from the outer and medial protrusions in the gripping area. Furthermore, among the multiple indentations, the depth Do of indentation 211 of the outer region is less than the depth Di of indentation 212 of the medial region.

In this manner, the gripping force in the outer region is less than that of the gripping force in medial region in the area of anvil 110 and horn 140 that grips electrode tab 210. Consequently, the depth of protrusions 111 and 151 digging into electrode tab 210 in the outer region is less than the depth of the digging into the medial region. As a result, it is possible to reduce the indentation size of the outer region within the gripping area of electrode tab 210 to less than the indentation size of the medial region. Alternatively, the thickness To of the site of indentation 211 in the outer parts is greater than the thickness Ti of the site of indentation 212 in the medial parts. Because the rupture strength at the site of indentation 211 in the outer region is greater than the site of indentation 212 in the medial region, crack generation at the edge of bonded part 215 may be reduced or eliminated during material use.

In other words, external forces concentrate on the material that has become thin around the outer regions of bonded part 215 of electrode tab 210 when a tensile load or vibration is applied to the bonded part of electrode tab 210. However, increasing the thickness of the outer region of the material with respect to the inner region may improve the rupture strength of the overall electrode tab 210. It may be particularly effective in the improvement of fatigue strength that occur from repeated input of low loads that electrode tab 210 is subjected to.

Note that although extruding protrusions 111 and 151 in a prismoidal shape by drastically excising the adjacent area of the tips may result in a different shape from extruding protrusions 112 and 152, the present disclosure is not limited to this structure. For example, protrusions 111 and 151 may be the same shape, but lower in height compared to protrusions 112 and 152. In other words, the area of the tip of each protrusion may be identical while still providing less gripping force on the outer region of the material.

Figure 6:
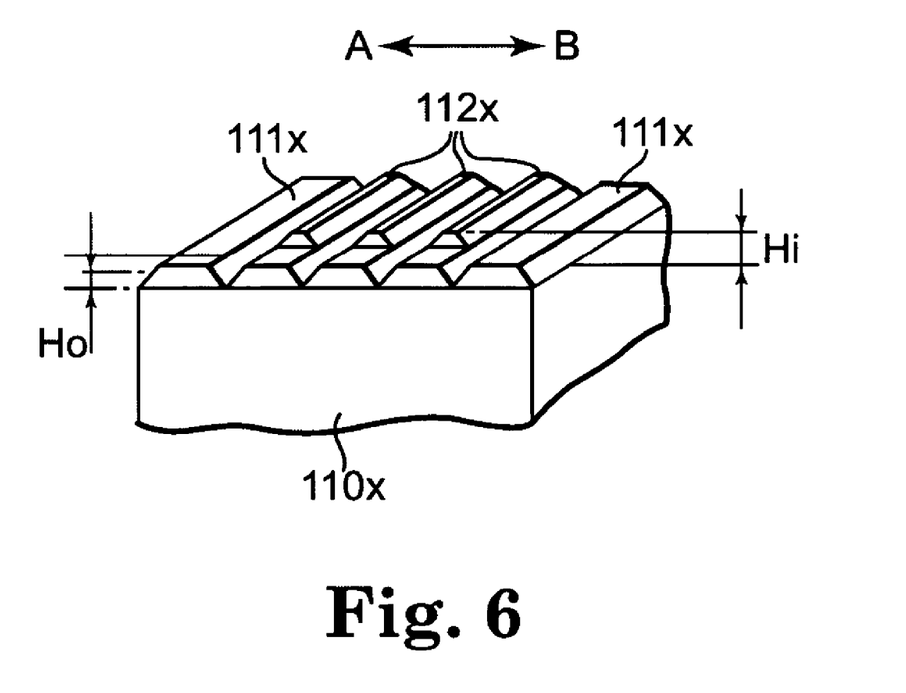
FIG. 6 is a perspective view of modified protrusions of a an anvil or a horn

Furthermore, protrusions are not limited to a prismoidal shape. For example, protrusions 111x and 112x may be formed in the shape of ridges in anvil 110x, as shown in FIG. 6. Similarly, protrusions are formed in the shape of ridges at horn tip 150 as well. Here, protrusions are formed in the shape of ridges so that the longitudinal direction of the protrusions is orthogonal to the moving direction of the ultrasonic vibration of horn tip 150, thus, making it possible to transmit ultrasonic vibration to the material work by gripping the material firmly.

Moreover, it remains that the gripping force in the outer region in the direction of the vibration of the horn is set to at least less than the gripping force in the medial region. Stated differently, the height of outer protrusions in the direction of the vibration of the horn is set to at least a height lower than the medial protrusions. However, better results may be realized by setting the gripping force in the entire peripheral portion, outer regions, to less than the gripping force in the medial regions. Alternatively, the strength of the material in the middle of the gripping area is weakest while the strength of the material in the outer regions of the gripping area is the strongest.

Figure 7:
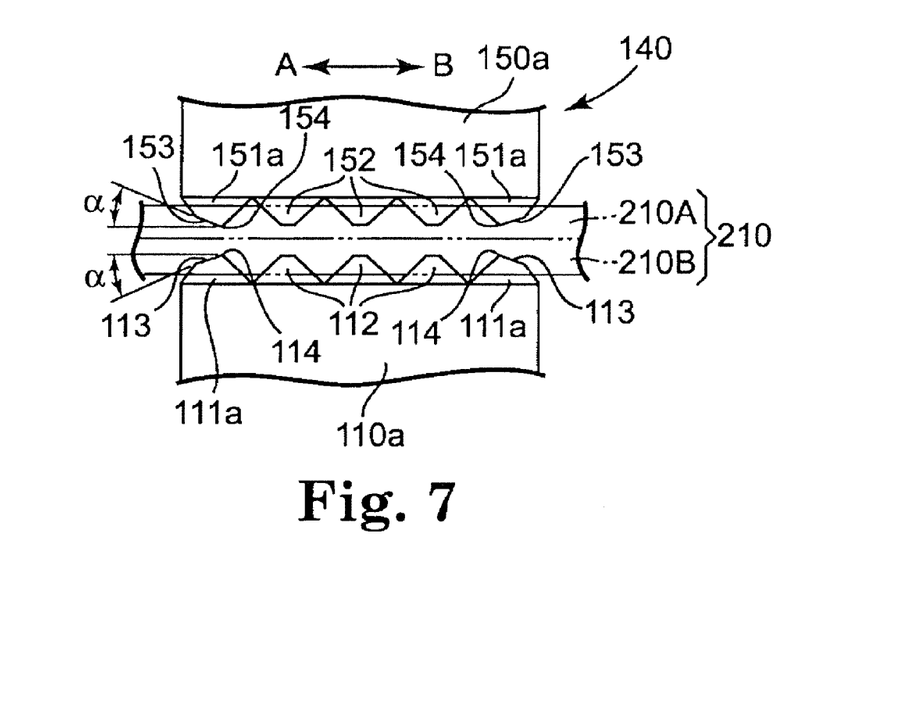
FIG. 7 is a cross-section of bonded material between alternative outer protrusions that include an inclined plane.

FIG. 7 is a cross-section of bonded material between alternative outer protrusions that include an inclined plane. This embodiment shown in FIG. 7 diverges from the previous embodiment in the structure of the multiple protrusions on anvil 110a and horn tip 150a of the horn 140.

In this embodiment, multiple protrusions in anvil 110a and horn tip 150a of horn 140 include sectional rectilinear figure-shaped inclined planes 113 and 153. Planes 113 and 153 have reduced height from the medial region toward the outer region compared to the outer protrusions 111a and 151a, in which the outer protrusions have undergone chamfering to match the respective inclined plane. Herein, the inclined plane formed on one protruding portion is a continuous surface having, for example, an abbreviated uniform angle α compared to a horizontal plane. However, the inclined plane angles of protruding portion 111a and protruding portion 151a may differ from each other. Furthermore, the above-mentioned chamfering may be performed for the outer protrusions of either anvil 110a or horn tip 150a.

Figure 8:
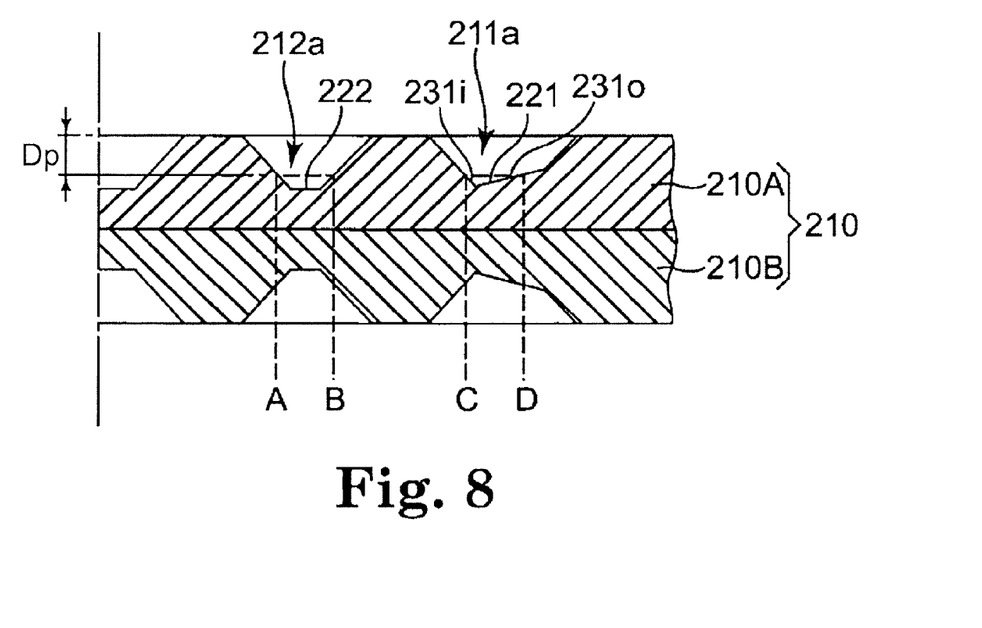
FIG. 8 is an enlarged cross-sectional view of the protrusions of the ultrasonic bonding equipment shown in FIG. 7.

FIG. 8 is an enlarged cross-sectional view of the protrusions of the ultrasonic bonding equipment shown in FIG. 7. Electrode tab 210, which includes laminated multiple bonded materials, is ultrasonically bonded by application of pressure and vibration from horn 140. Multiple indentations are formed on the external surface of electrode tab 210 due to the downward pressure. Furthermore, among the multiple indentations, bottom panel 221 of indentation 211a in the outer region is an inclined plane with reduced depth toward the outside of the bonding structure. In this embodiment, bottom panel 221 of indentation 211a on the outer region forms a sectional rectilinear figure-shaped inclined plane.

In FIG. 8, the region between A and B, as well as the region between C and D, is deeper than the prescribed depth Dp. These areas effectively bond the materials, such as electrode tab 210A and electrode tab 210B. The depth of the indentations are deeper due to the region between B and C, as well as the region outside point D, being non-bonding area in which electrode tab 210A and electrode tab 210B are not bonded.

In other words, the bonding area (the region between C and D) of the indentation formed from protrusion 151a, i.e., the internal surface of indentation 211a in the outer region is formed such that the inclination of outside internal surface 231o is more gradual than the inclination of inside internal surface 231i.

Therefore, according to the embodiment of FIG. 8, the outer portion of indentation 211a in the outer region of the bonding area is formed of a lower gripping force. The depth of the outer protrusion digging into the materials decreases. As a result, it is possible to increase the thickness of the outer region in the gripping area of electrode tab 210 to more than the thickness of the medial region of the bonded material. Consequently, it is possible for the embodiment of FIG. 8 to reach similar effects to that of other embodiments described herein.

Figure 9:
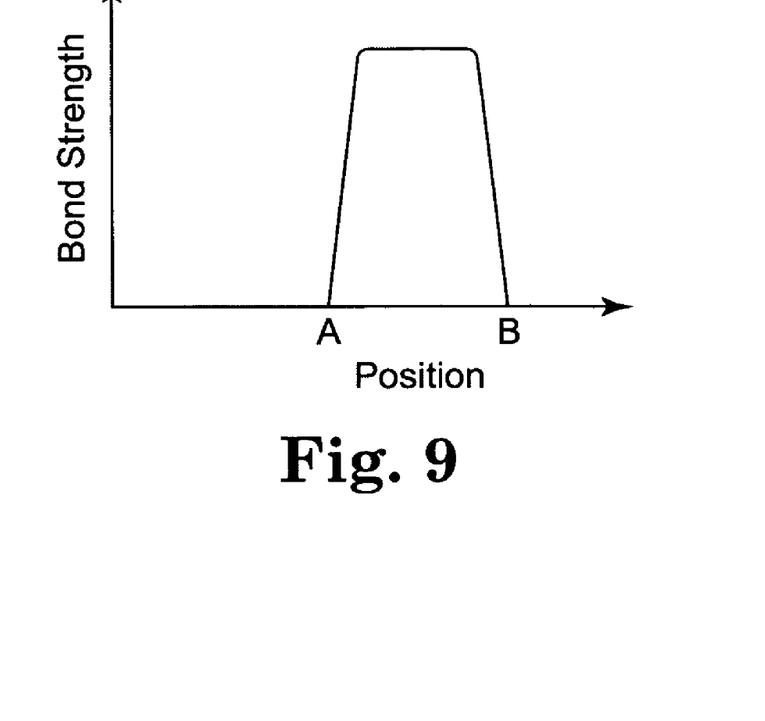
FIG. 9 is an exemplary chart of bond strength in the bonding area of an indentation of medial protrusions.
Figure 10:
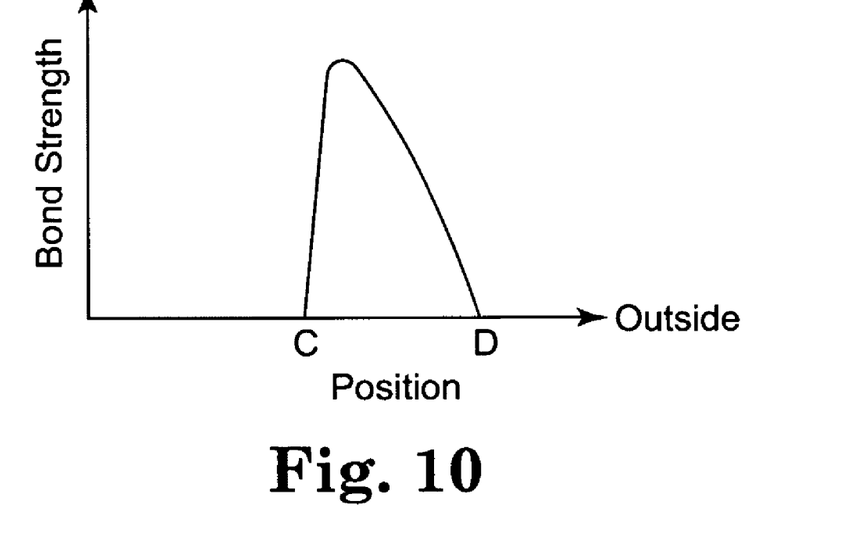
FIG. 10 is an exemplary chart of bond strength in the bonding area of an indentation of outer protrusions.

FIG. 9 is a distribution chart of the bond strength in the bonding area of indentation 212a in the medial region, where FIG. 10 is a distribution chart of the bond strength in the bonding area of indentation 211a in the outer region. Bond strength is an indication of structural strength against loads on bonded materials after completion of ultrasonic bonding. The greater the thickness of the material between the protrusions decreases the bond strength of that material due to bonding under less pressure. As shown in FIG. 10, the bond strength becomes gradually weaker towards the outer edge, which is shown in the region between C and D of indentation 211a in the outer region.

In consequence, when external force, such as tensile load or vibration, is applied to the bonded part 215, the concentration of stress from external force may be reduced or alleviated due to the gradual thickness increase at the outer edge. Furthermore, the inside edges 114 and 154 of the inclined plane in protrusions for which chamfering has been performed may have an increased the bond strength. This results from the materials being strongly pressed.

Figure 11:
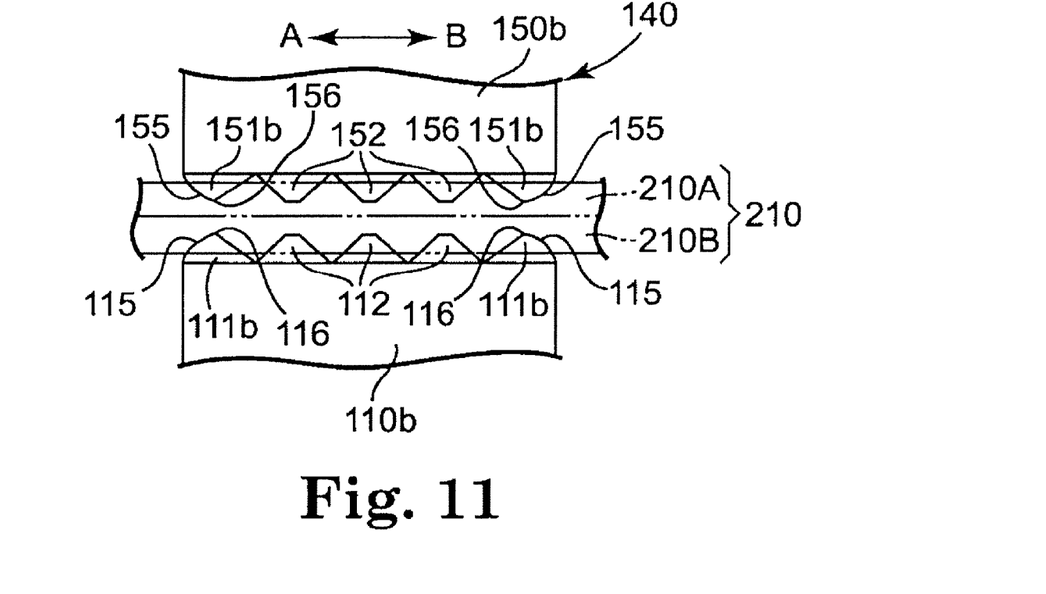
FIG. 11 is a cross-section of bonded material between medial and outer protrusions, where the outer protrusions are chamfered.

FIG. 11 shows an alternative embodiment for bonding of electrode tab 210 of an electric cell by means of ultrasonic bonding equipment 100. FIG. 11 includes a structure of the multiple protrusions on anvil 110b and the horn tip 150b of horn 140. Note that the description of parts in common with the abovementioned embodiments is omitted.

In the embodiment of FIG. 11, anvil 110b and the horn tip 150b of horn 140 is shown. Corner rounding has been performed to form the sectional arc-shaped inclined planes 115 and 155 with reduced height from medial regions toward the outer regions compared to outermost protrusions 111b and 15b among the multiple protrusions. However, the curvature radius of the abbreviated arc shape of the inclined planes of protrusions 111b and protrusions 151b may differ from each other. Furthermore, the abovementioned corner rounding can be performed for protrusions of the outer regions of either anvil 110b or horn tip 150b.

Figure 12:
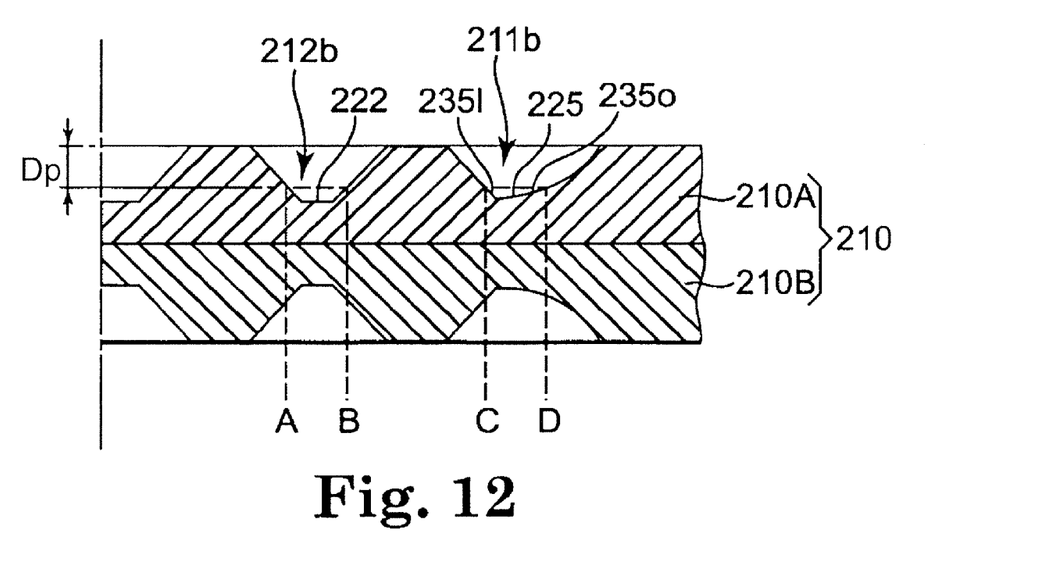
FIG. 12 is an enlarged cross-sectional view of the protrusions of the ultrasonic bonding equipment shown in FIG. 11.

FIG. 12 is an enlarged cross-sectional view of the protrusions of the ultrasonic bonding equipment shown in FIG. 11. Electrode tab 210, which is formed from laminated multiple layers of material, is ultrasonically bonded by the application of pressure and vibration from horn 140. Multiple indentations are formed on the external surface of electrode tab 210, i.e., the material, due to the pressure. Furthermore, among the multiple indentations, bottom panel 225 of indentation 211b in the outer region is an inclined plane with reduced depth toward the outside of the bonding area. In this embodiment, bottom panel 225 of indentation 211b in the outer region forms a sectional arc-shaped inclined plane.

In FIG. 12, the region between A and B, as well as the region between C and D, in which electrode tab 210 is a bonded material, is pressed to more than the prescribed depth Dp. This is done to indicate that the bonding area in which electrode tab 210A and electrode tab 210B are bonded effectively between these points. Alternatively, the region between B and C, as well as the region outside point D, indicates a non-bonding area in which electrode tab 210A and electrode tab 210B are not bonded together.

In other words, the bonding area (the region between C and D) of indentation 211b, the internal surface of indentation 211b in the outer region is formed so that the inclination of outside internal surface 235o is more gradual than the inclination of inside internal surface 235i.

Therefore, the bonding area of indentation 211b in the outer region includes less bonding force closer to the outside of the gripped area. The less bonding force corresponds to a shallower digging depth of the respective protrusions. In addition, it is possible to increase the thickness around the outer edges of the gripping area of electrode tab 210 to more than the thickness of the inside edges of the outer region. As a result, the material strength increases towards the outer region of the bonded area.

Furthermore, as shown in FIGS. 7-10, the rounded corners of the outer region gradually decreases the bonding strength in the bonding area (the region between C and D) of indentation 211b closer to the outer edge. Therefore, the concentration of stress from external forces may be alleviated when the external forces, i.e., a tensile load or vibration, are applied to the bonded part 215. In addition, the inside edges 116 and 156 of the inclined plane on outer protrusions on which corner rounding has been performed may provide an advantage of increased bond strength due to the electrode tab 210 being strongly pressed towards the inner region. Moreover, the concentration of stresses may be further alleviated due to the roundness of the corner of the outside of indentation 211b. Prevention of generated cracks may be ensured while ultrasonically bonding and loading the materail after bonding.

Figure 13:
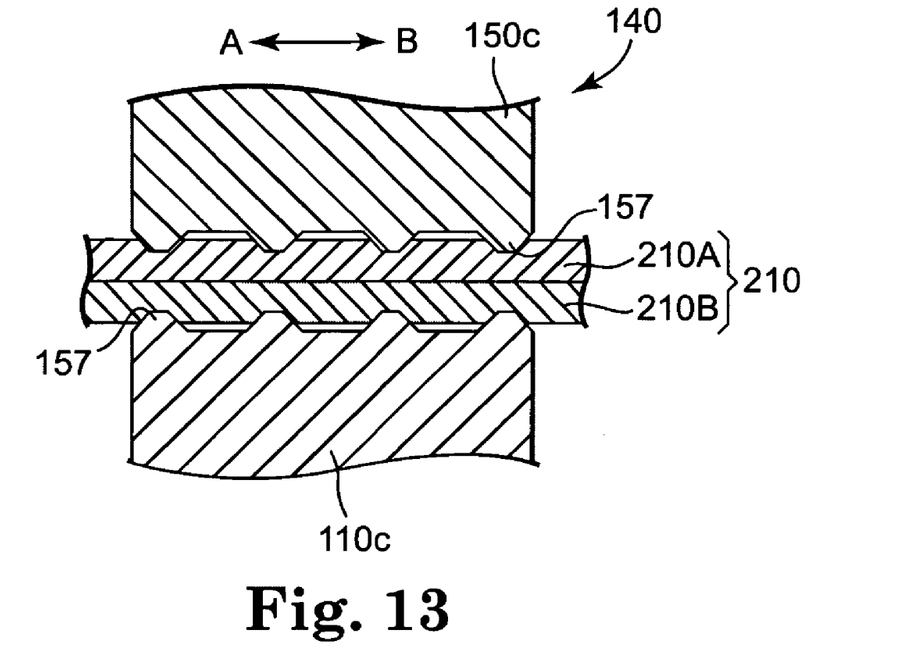
FIG. 13 is a cross-sectional view of bonding material between spaced protrusions of the anvil and the horn.
Figure 14:
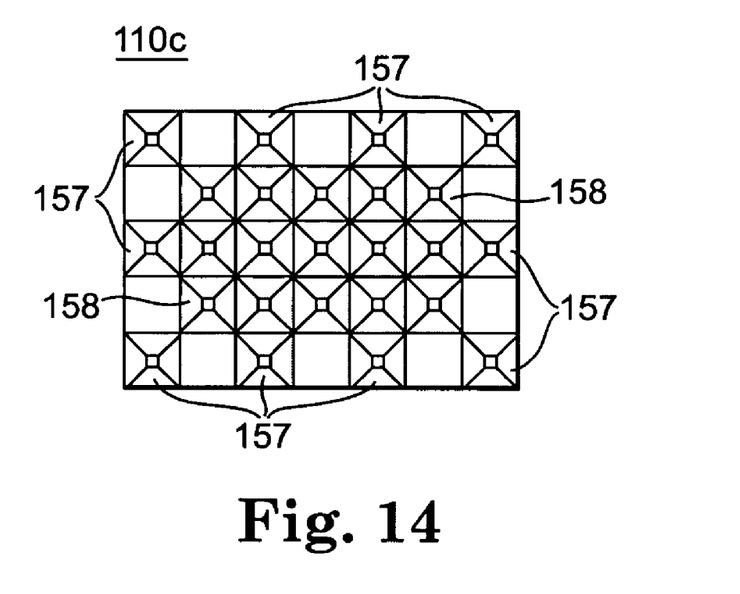
FIG. 14 is a plan view of an exemplary anvil or horn shown in FIG. 13.

FIG. 13 is a cross-sectional view of bonding material between spaced protrusions of the anvil and the horn, and FIG. 14 is a plan view of an exemplary anvil or horn shown in FIG. 13. The embodiment of FIGS. 13 and 14 diverge from the embodiments of FIGS. 3-12 in the structure of the multiple protrusions on anvil 110c and the horn tip 150c of horn 140.

FIGS. 13 and 14 show the multiple protrusions on anvil 110c and the horn tip 150c of horn 140, where spaces formed on protruding portion 157 of the outermost region are set so as to be larger than the spaces formed on protrusions 158 of the medial regions. However, space formed on protrusions 157 of the outer part of either the anvil 110c or horn tip 150c may be set so as to be larger than the spaces formed on protrusions 158 of the medial parts. Furthermore, the dimensions of the spaces formed on protrusions 157 of the outer parts may vary and not be limited to the space of a single protruding portion. In addition, FIG. 13 shows a cross-sectional view sliced in a vertical plane through the protrusions 157 of the outer region. Here, protrusions 157 and 158 are presented for example with a quadrilateral shape. In addition, protrusions on the horn tip 150c are formed similarly to protrusions on the anvil shown in FIG. 12.

Figure 15:
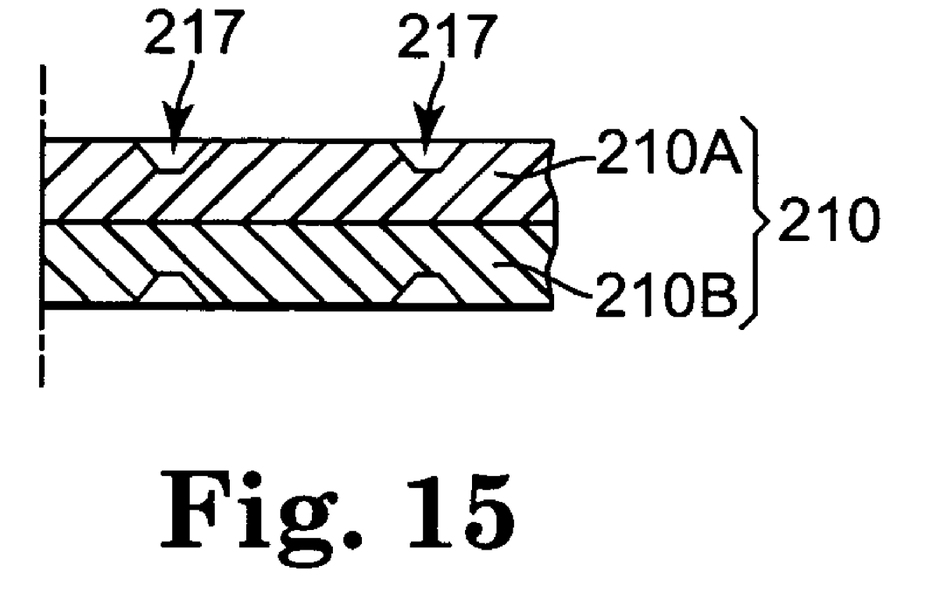
FIG. 15 is an enlarged cross-sectional view of multiple bonded materials bonded by the ultrasonic bonding equipment illustrated in FIG. 13 and FIG. 14.

FIG. 15 is an enlarged cross-sectional view of multiple bonded materials bonded by the ultrasonic bonding equipment illustrated in FIG. 13 and FIG. 14. FIG. 15 shows a cross-sectional view of a vertical plane through only indentation 217 of the outer region of electrode tab 210. Electrode tab 210, which is laminated multiple layer material, is ultrasonically bonded by application of pressure and vibration from outside, and due to the pressure, multiple indentations are formed on the external surface of electrode tab 210. Furthermore, among the multiple indentations, the space formed on indentation 217 of the outer region is larger than the space formed on the indentation of the medial region.

In this manner, according to the ultrasonic bonding equipment in the embodiment of FIG. 15, spaces formed on protrusions 157 of the outer region are set so as to be larger than the spaces formed on protrusions 158 of the medial region. Spaces between the indentations formed on the external surface of electrode tab 210 by protrusions are larger in the outer region than in the medial region, which may reduce the risks associated with generating chain-reaction breakage at adjacent indentations in outer regions.

Note that in a way similar to the embodiments shown in FIGS. 4-6, as well as in the embodiments shown in FIGS. 7-15, outer protrusions along two parallel sides of the gripping area may be formed differently than the medial protrusions. However, other embodiments may include outer protrusion along 4 sides of the gripping area, or the entire peripheral bonding area, are formed differently than the medial protrusions. In any case, the bonded material includes indentations that are less deep closer to the outer region than the indentations of the medical region.

The present invention is not limited only to the abovementioned embodiments, and can be changed in various ways within the scope of the claims. For example, in abovementioned embodiment, the electrode tabs 210 of an electric cell 200 have been cited as examples of welded material, but the welded materials are not limited to these. Similarly, the shape of the protrusions incorporated into the anvil and horn tip of the horn are not limited to those shown in the drawings and make take on any arbitrary shape. Furthermore, it is possible to implement a combination of any two or more structures of protrusions in the abovementioned multiple embodiments. Various embodiments of the invention have been described. These and other embodiments are within the scope of the following claims.

The invention claimed is:

1. An ultrasonic bonding system comprising:
an anvil and a horn arranged facing the anvil to ultrasonically bond a gripped portion of two or more layers of material,
the gripped portion of the layers including an inner region and an outer region, and at least one of the anvil and the horn comprising a plurality of medial protrusions arranged to apply a gripping force to the inner region and a plurality of outer protrusions arranged to apply a gripping force to the outer region that is less than the gripping force applied to the inner region of the gripped material, each of the medial protrusions and the outer protrusions having a circular truncated cone shape, the outer protrusions forming an outer periphery about the medial protrusions,
with spaces between tip ends of adjacent peripheral ones of the outer protrusions being larger than spaces between tip ends of adjacent ones of the medial protrusions as viewed in a direction of the gripping force and as measured in directions parallel to each other.

2. The system of claim 1, wherein
the horn is arranged such that pressure and vibration from the horn ultrasonically bond the material.

3. The system of claim 1, wherein
the outer protrusions protrude at a height less than the medial protrusions.

4. The system of claim 1, wherein
the material comprises electrode tabs of a flat electric cell.

5. The system of claim 1, wherein
the medial and outer protrusions are configured and arranged such that the material comprises multiple indentations formed on an outer surface of the bonded material, and wherein a depth of indentations formed from the outer protrusions is smaller than a depth of indentations formed from the medial protrusions.

6. A system for ultrasonic bonding, the system comprising:
means for gripping two or more layers of a material between an anvil and a horn, wherein both the anvil and the horn comprise an outer region and an inner region;
means for producing a gripping force at the outer region of the gripping means less than a gripping force at the inner region of the gripping means, the means for producing a gripping force comprising protrusions having a circular truncated cone shape, the protrusions including outer protrusions which produce the gripping force at the outer region and medial protrusions that produce the gripping force at the inner region, the outer protrusions forming an outer periphery about the medial protrusions, with spaces between tip ends of adjacent peripheral ones of the outer protrusions being larger than spaces between tip ends of adjacent ones of the medial protrusions as viewed in a direction of the gripping force and as measured in directions parallel to each other; and
means for bonding the material.

* * * * *